United States Patent Office 3,636,043
Patented Jan. 18, 1972

3,636,043
METHOD FOR THE PREPARATION OF 4-AL-KYLPROLINES AND COMPOUNDS PRODUCED THEREBY

Barney J. Magerlein, Kalamazoo, Mich., assignor to The Upjohn Company, Kalamazoo, Mich.
No Drawing. Filed Feb. 4, 1969, Ser. No. 796,558
Int. Cl. C07d 27/04
U.S. Cl. 260—326.3                     7 Claims

ABSTRACT OF THE DISCLOSURE

4 - alkylprolines are prepared in relatively high yields by reacting a 2-alkylacrolein with a dialkyl N-alkanoylamidomalonate, dehydrating the obtained 4-alkylpyrrolidine, and thereafter hydrolyzing, decarboxylating, and catalytically hydrogenating the produced 4-alkyl-4-pyrroline. The 4-alkyl-prolines are useful as intermediates for the preparation of 4-alkylhygric acids which, in turn, are a source of component acids that are reacted with amino sugars to form antibiotics of the lincomycin type.

BACKGROUND OF THE INVENTION 4-alkylhygric acids are starting materials for the preparation of antibiotics of the lincomycin type as set forth in U.S. Pat. 3,297,716 issued on Jan. 10, 1967. It is very desirable to produce said acids and their 4-alkylproline precursors in high yields and at a commercially attractive cost. The present invention provides a method whereby the foregoing is readily achieved.

SUMMARY OF THE INVENTION

The method of the herein claimed invention contemplates the reaction of 2-alkylacrolein with dialkyl N-alkanoylamidomalonate so as to produce a 4-alkylpyrrolidine, dehydrating the latter to the corresponding 4-alkyl-4-pyrroline and thereafter hydrolyzing, decarboxylating, and catalytically hydrogenating said 4-pyrroline. Also contemplated and within the purview of the present invention are the particular 4-alkyl-4-pyrrolines, 4-alkyl-5-pyrrolines, and 4-alkylpyrrolidines produced at intermediate stages in the aforesaid method.

DETAILED DESCRIPTION OF THE INVENTION

The overall reaction sequence contemplated by the present invention is schematically represented below.

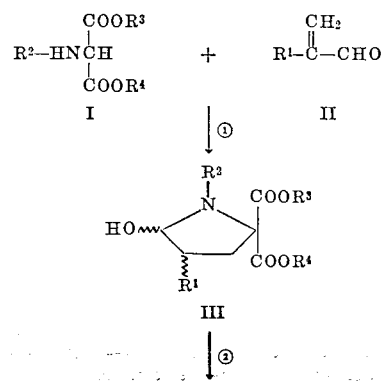

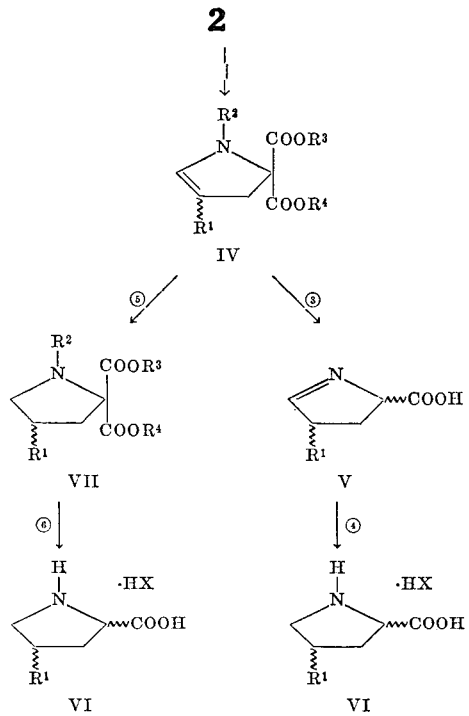

In the above formulas, $R^1$ can be alkyl containing from 1 to 8 carbon atoms, inclusive, i.e., methyl, ethyl, the propyls, the butyls, the pentyls, the hexyls, the heptyls, and the octyls. $R^2$ can be alkanoyl containing from 1 to 4 carbon atoms, inclusive, i.e., formyl, acetyl, propionyl, and butyryl. $R^3$ and $R^4$ can be alike or different and can be alkyl containing from 1 to 6 carbon atoms, inclusive, i.e., methyl, ethyl, the propyls, the butyls, the pentyls, and the hexyls. The term HX is used to designate an acid addition salt which can be of a monovalent or polyvalent acid.

As set forth in the foregoing reaction sequence, the starting materials contemplated for the method of the present invention are a dialkyl N-alkanoylaminomalonate (I) and a 2-alkylacrolein (II). Both groups of materials are known in the art and some are commercially available. 2-alkylacroleins can be prepared in accordance with the teachings of Green et al., J. Chem. Soc. 1957, p. 3262.

The reaction between the dialkyl N-alkanoylamidomalonate (I) and 2-alkylacrolein (II) (Step 1) is brought about by admixing these compounds in the presence of a base such as an alkali metal alkoxide, e.g. sodium methoxide, sodium ethoxide, potassium methoxide, or the like, and in an inert organic solvent such as benzene, ethanol, methanol, or the like. While the reaction normally is carried out at ambient temperatures, the reaction temperature can be as low as about 0° C., or lower, or as high as about 60° C., or higher, depending on the boiling point of the solvent used.

The reaction product thus obtained is the corresponding 4-alkylpyrrolidine (III) which is then dehydrated (Step 2) by means of an acid dehydrating agent such as hydrochloric acid, sulfuric acid, $P_2O_5$, or the like, in an inert, non-aqueous solvent such as absolute ethanol, benzene, toluene, or the like. The dehydration is preferably carried out at ambient temperature; however, the temperature can be as low as about 10° C., or lower, or as high as about 100° C. or higher, depending on the desired reaction rate and the decomposition temperatures of the reactants and reaction products.

The aforesaid dehydration produces a 4-alkyl-4-pyrroline (IV) which is then subjected to hydrolysis and decarboxylation (Step 3) followed by catalytic hydrogenation (Step 4), or in the alternative, subjected to catalytic hydrogenation (Step 5) followed by hydrolysis and decarboxylation (Step 6). Hydrolysis and decarboxylation of a 4-alkyl-4-pyrroline (Step 3) yields the corresponding 4-alkyl-5-pyrroline (V) which is then catalytically hydrogenated to the desired end product 4-alkylproline (VI) (Step 4). On the other hand, catalytic hydrogenation of a 4-alkyl-4-pyrroline (Step 5) yields the corresponding 4-alkylpyrrolidine (VII) which is then hydrolyzed and decarboxylated to the desired end product 4-alkylproline (VI) (Step 6).

Hydrolysis and decarboxylation (Step 3 or Step 6) is achieved by treating the 4-alkyl-4-pyrroline (IV) with a strong, non-oxidizing acid such as hydrochloric acid, trichloroacetic acid, trifluoroacetic acid, or the like. This reaction is preferably carried out at the reflux temperature of the reaction mixture; however, the reaction temperature can be as high as about 150° C., or higher. Before hydrolysis and decarboxylation is commenced, the inert, non-aqueous solvent present in the reaction mixture resulting after Step 2 can be removed therefrom, if desired, by evaporation or similar means. This is not essential, however.

Catalytic hydrogenation (Step 4 or Step 5) is carried out using hydrogen gas in the presence of a hydrogenation catalyst such as Raney nickel, the noble metal catalysts, i.e., palladium-on-carbon, platinum, rhodium, or the like. The catalytic hydrogenation proceeds satisfactorily at ambient temperatures; however, temperatures up to about 200° C., or higher, can be utilized. Reaction pressure can range from atmospheric up to about 1000 atmospheres, or higher. An absolute pressure of about 1 to about 2 atmospheres is preferred.

The desired end product, the corresponding 4-alkylproline (VI), is recovered from the reaction mixture in the conventional manner by evaporation followed by trituration and optional recrystallization depending on the desired degree of purity, usually as an acid addition salt. The free base compound is readily obtained from the salt by treatment with a suitable base using techniques commonly employed in the art.

The present invention is further illustrated by the following examples.

EXAMPLE I

Preparation of 1-acetyl-2,2-dicarbethoxy-5-hydroxy-4-pentylpyrrolidine

Diethyl acetamidomalonate (about 86.8 grams, 0.4 mole) is dissolved in benzene (about 800 milliliters). To the resulting solution is added, with stirring, alpha-pentylacrolein (about 55.6 grams, 0.44 mole), followed by sodium methoxide in methanol (about 2 milliliters of a 25 percent w./v. solution).

The thus produced admixture is permitted to stand at ambient temperature for about 18 hours, and thereafter the solvent is removed therefrom by distillation under reduced pressure. Thin layer chromatograph (TLC) of the obtained residue (on silica gel, 2:1 mixture of cyclohexane and acetone) shows the absence of diethylacetamidomalonate and the appearance of a new, slower moving spot (Rf~0.5) which does not absorb in the ultraviolet range. Nuclear magnetic resonance (NMR) is consistent with the presence of 1-acetyl-2,2-dicarbethoxy-5-hydroxy-4-pentylpyrrolidine.

In a similar manner, but starting with diethyl propionamidomalonate and 2-pentylacrolein the 1-propionyl-2,2 - dicarbethoxy-5-hydroxy-4-pentylpyrrolidine is prepared.

Starting with dipropyl butyramidomalonate and 2-ethylacrolein the 1 - butyryl-2,2-dicarbpropoxy-5-hydroxy-4-ethylpyrrolidine is prepared.

Starting with dibutyl formamidomalonate and 2-propylacrolein the 1 - formyl-2,2-dicarbbutoxy-5-hydroxy-4-propyl-pyrrolidine is prepared.

Starting with diethyl acetamidomalonate and 2-octylacrolein, the 1-acetyl-2,2-dicarbethoxy-5-hydroxy-4-octylpyrrolidine is prepared.

EXAMPLE II

Preparation of 1-acetyl-2,2-dicarbethoxy-4-pentyl-4-pyrroline

The crude residue obtained in Example I is dissolved in absolute ethanol (about 450 milliliters) and HCl gas is bubbled through the resulting solution for about 5 minutes.

The solution is then permitted to stand at ambient temperature for about 1.5 hours, and then filtered and evaporated to dryness.

The obtained residue is purified by chromatography over silica gel using a 2:1 mixture of cyclohexane and acetone for elution. The major fraction obtained therefrom is identified as 1-acetyl-2,2-dicarbethoxy-4-pentyl-4-pyrroline.

*Analysis.*—Calcd. for $C_{17}H_{27}NO_5$ (percent): C, 62.74; H, 8.37; N, 4.31. Found (percent): C, 62.14; H, 8.62; N, 4.40.

$\lambda_{max}$ 236, ε 9300 (diethyl ether).

Similarly, starting with 1-propionyl-2,2-dicarbethoxy-5-hydroxy - 4 - pentylpyrrolidine the 1-propionyl-2,2-dicarbethoxy-4-pentyl-4-pyrroline is prepared.

Starting with 1-butyryl-2,2-dicarbpropoxy-5-hydroxy-4-ethylpyrrolidine the 1-butyryl-2,2-dicarbpropoxy-4-ethyl-4-pyrroline is prepared.

Starting with 1-formyl -2,2-dicarbbutoxy-5-hydroxy-4-propylpyrrolidine the 1-formyl-2,2-dicarbbutoxy-4-propyl-4-pyrroline is prepared.

Starting with 1-acetyl - 2,2 - dicarbethoxy-5-hydroxy-4-octylpyrrolidine the 1-acetyl-2,2-dicarbethoxy-4-octyl-4-pyrroline is prepared.

EXAMPLE III

Preparation of 1-acetyl-2,2-dicarbethoxy-4-pentyl-4-pyrroline 1-acetyl-2,2-dicarbethoxy-5-hydroxy-4-pentylpyrrolidine (about 20 grams, 0.062 mole) is dissolved in benzene (about 200 milliliters), and phosphorus pentoxide (about 10 grams, 0.070 mole) is added to the resulting solution. The resulting admixture is warmed to about 50° C. and is permitted to stand for about 0.5 hour at ambient temperature. Thereafter additional phosphorus pentoxide (about 2 grams, 0.014 mole) is added to the admixture followed by the warming thereof to about 45° to 50° C.

Thin layer chromatography of the reaction product shows almost complete dehydration with no change following the second addition of phosphorus pentoxide—the dehydrating agent.

EXAMPLE IV

Preparation of 2-carboxy-4-pentyl-5-pyrroline hydrochloride

The entire crude product of 1-acetyl-2,2-dicarbethoxy-4-pentyl-4-pyrroline obtained in Example II is admixed with 6 N hydrochloric acid (about 460 milliliters) and the resulting mixture heated at reflux for about 2.5 hours. Thereafter the produced reaction mixture is extracted with diethyl ether so as to remove a small amount of deeply colored oil observed to be present.

The extract is evaporated under reduced pressure and a reddish oil, identified as 2-carboxy-4-pentyl-5-pyrroline hydrochloride, is obtained as the residue.

In a like manner, but starting with 1-propionyl-2,2-dicarbethoxy-4-pentyl-4-pyrroline the 2-carboxy-4-pentyl-5-pyrroline hydrochloride is prepared.

Starting with 1-butyryl - 2,2 - dicarbpropoxy-4-ethyl-4-pyrroline the 2-carboxy-4-ethyl-5-pyrroline hydrochloride is prepared.

Starting with 1-formyl - 2,2 - dicarbbutoxy-4-propyl-4-pyrroline the 2-carboxy-4-propyl-5-pyrroline hydrochloride is prepared.

Starting with 1-acetyl-2,2-dicarbethoxy-4-octyl-4-pyrroline the 2-carboxy-4-octyl-5-pyrroline hydrochloride is prepared.

EXAMPLE V

Preparation of 4-pentylproline hydrochloride 2-carboxy-4-pentyl-5-pyrroline hydrochloride obtained in Example IV (about 15 grams, 0.082 mole) and 10 percent w./w. palladium-on-carbon catalyst (about 7.5 grams) in methanol (about 180 milliliters) is admixed and shaken under hydrogen at ambient temperature for about 18 hours. Thereafter the catalyst is removed by filtration and the filtrate evaporated to dryness.

About 14.1 grams of a residue is obtained. The residue is triturated with acetone (about 45 milliliters) and filtered. The filtered residue (about 8.74 grams) is identified as 4-pentylproline hydrochloride, melting at 194° C. to 199° C. (sinter at 187° C.), obtained in about 68 percent yield based on diethyl acetamidomalonate, the starting material.

EXAMPLE VI

Preparation of 4-pentylproline hydrochloride by prior art method

Granulated zinc (about 22.8 grams) is added to a mixture of 1-acetyl-2,2-dicarbethoxy-5-hydroxy-4-pentylpyrrolidine (about 13.7 grams, 0.042 mole) and 6 N hydrochloric acid (about 274 milliliters). The resulting admixture is stirred at about reflux temperature for about 1 hour and then decanted. Evaporation at reduced pressure gives a solid residue (about 16.7 grams) which is then dissolved in hot water (about 450 milliliters). Zinc salts are precipitated from the resulting solution by the addition of hydrogen sulfide and removed therefrom by filtration. The precipitation and filtration are repeated several times.

Evaporation of the solution yields a solid residue (about 3.0 grams) which is then triturated with acetonitrile. The obtained crude crystals are then collected and recrystallized from aqueous acetonitrile. About 1.4 grams of 4-pentylproline hydrochloride melting at 197° to 200° (sinter at 183° C.) is obtained. This represents a 16 percent yield based on diethyl acetamidomalonate.

EXAMPLE VII

Preparation of 1-acetyl-2,2-dicarbethoxy-4-pentylpyrrolidine 1-acetyl-2,2-dicarbethoxy - 4 - pentyl-4-pyrroline (about 10 grams, 0.033 mole) is admixed with 10 percent w./w. palladium-on-carbon catalyst (about 2.4 grams) in methanol (about 160 mililiters) and the mixture shaken under hydrogen at atmospheric pressure for about 3 hours. Thereafter the catalyst is removed from the reaction mixture by filtration. Thin layer chromatography does not provide a sample having ultraviolet absorption. The reaction product is identified as 1-acetyl-2,2-dicarbethoxy-4-pentylpyrrolidine.

In a manner similar to the above but starting with 1-propionyl-2,2-dicarbethoxy - 4 - pentyl-4-pyrroline the 1-propionyl-2,2-dicarbethoxy - 4 - pentylpyrrolidine is prepared.

Starting with 1-butyryl - 2,2 - dicarbpropoxy-4-ethyl-4-pyrroline the 1-butyryl-2,2-dicarbpropoxy-4-ethylpyrrolidine is prepared.

Starting with 1-formyl - 2,2 - dicarbbutoxy-4-propyl-4-pyrroline the 1-formyl-2,2-dicarbbutoxy-4-propylpyrrolidine is prepared.

Starting with 1-acetyl-2,2-dicarbethoxy-4-octyl-4-pyrroline the 1-acetyl-2,2-dicarbethoxy-4-octylpyrrolidine is prepared.

EXAMPLE VIII

Preparation of 4-pentylproline hydrochloride

Crude 1-acetyl-2,2-dicarbethoxy - 4 - pentylpyrrolidine (about 2 grams, 0.065 mole), prepared in Example VII, is mixed with 6 N hydrochloric acid (about 8 mililiters) and the resulting mixture heated at reflux for about 2.5 hours. Thereafter the obtained reaction mixture is cooled and evaporated to dryness. The obtained residue is recrystallized from acetone and about 110 milligrams of 4-pentylproline hydrochloride melting at 191° C. to 194° C. (sinter at 176° C.) is recovered.

EXAMPLE IX

Preparation of 2-carboxy-4-pentyl-5-pyrroline

Crude 2-carboxy-4-pentyl - 5 - pyrroline hydrochloride (about 45.8 grams), prepared in a manner similar to Example IV is dissolved in water (about 300 milliliters), and the resulting solution is passed through a cation-exchange resin column in a hydrogen cycle. A basic solution is eluted therefrom and evaporated to dryness. The obtained residue is identified as 2-carboxy-4-pentyl-5-pyrroline.

*Analysis.*—Calcd. for $C_{10}H_{17}NO_2$ (percent): C, 65.54; H, 9.35. Found (percent): C, 64.48; H, 9.15.

As set forth above, the method of the present invention is useful for the production of 4-alkylprolines which, in turn, serve as intermediates for the production of 4-alkylhygric acids that are known starting materials for the preparation of antibiotics of the lincomycin type. The conversion of 4-alkylprolines to 4-alkylhygric acids is brought about by alkylation of 4-alkylprolines with formalin and hydrogen in the presence of palladium-on-carbon catalyst.

In the production of antibiotics the 4-alkylhygric acids are reacted with amino sugars as disclosed in U.S. Pat. 3,096,912, for example.

Moreover, the 4-alkylhygric acids can be converted to the corresponding amides which, in turn, can be converted to alkyl halide quaternary ammonium salts. The latter are electroconductive wetting agents and can be used to prepare electrocardiographic jellies.

The 4-alkyl-4-pyrrolines, 4-alkyl-5-pyrrolines, and 4-alkylpyrrolidines disclosed herein are useful for the production of the corresponding 4-alkylprolines as set forth in detail above.

What is claimed is:

1. A method for the preparation of 4-alkylproline (VI) wherein the alkyl group is of 1 to 8 carbon atoms, inclusive, which comprises the steps of:

reacting 2-alkylacrolein (I), wherein alkyl is defined as above, with dialkyl N-alkanoylamidomalonate (II), wherein alkyl is of 1 to 6 carbon atoms, inclusive, and alkanoyl is of 1 to 4 carbon atoms, inclusive, in the presence of an alkali metal alkoxide between 0° and 60° C.;

dehydrating the corresponding, thus obtained 4-alkylpyrrolidine (III) with a dehydrating agent selected from the group consisting of hydrogen chloride, sulfuric acid and $P_2O_5$ in an inert non-aqueous solvent between 10 and 100° C.;

hydrolyzing and decarboxylating the thus obtained corresponding 1 - alkanoyl-2,2-dicarbalkoxy-4-alkyl-4-pyrroline (IV) wherein alkoxy of the carbalkoxy group is of 1 to 6 carbon atoms, inclusive by heating with a strong, non-oxidizing acid selected from the group consisting of hydrochloric acid, trichloroacetic acid and trifluoroacetic acid at the reflux temperature of the mixture or up to 150° C.; and catalytically hydrogenating the obtained corresponding 2-carboxy-4-alkyl-5-pyrroline (V) with a noble metal catalyst or Raney nickel catalyst between 20 and 200° C. to obtain the corresponding 4-alkyl-proline (VI) of above.

2. The method in accordance with claim 1 wherein hydrolyzing and decarboxylating are carried out with a strong, non-oxidizing acid selected from the group consisting of hydrochloric acid, trichloroacetic acid and trifluoroacetic acid at about the reflux temperature of the resulting reaction mixture.

3. The method in accordance with claim 1 wherein the catalytic hydrogenation is carried out with hydrogen in the presence of an effective amount of a hydrogenation catalyst selected from noble metal catalysts or Raney nickel at about room temperature and at a pressure in the range from about 1 to 2 atmospheres.

4. The method in accordance with claim 1 wherein after dehydrating, the solvent present in the reaction mixture is removed before proceeding with hydrolyzing, decarboxylating and a catalytic hydrogenation.

5. The method in accordance with claim 1 wherein the corresponding 4-alkyl-4-pyrroline wherein the alkyl group is of 1 to 8 carbon atoms, inclusive, is first hydrolyzed and decarboxylated and thereafter catalytically hydrogenated.

6. The method in accordance with claim 1 wherein the corresponding 4-alkyl-4-pyrroline (IV) wherein the alkyl group is of 1 to 8 carbon atoms, inclusive, is first catalytically hydrogenated to give the corresponding 1-alkanoyl-2,2-dicarbalkoxy-4-alkylpyrrolidine (VII) and thereafter hydrolyzed and decarboxylated.

7. The method in accordance with claim 1 wherein the dehydration is carried out at about room temperature.

References Cited
UNITED STATES PATENTS 3,364,197    1/1968    Hoeksema _____ 260—210

ALEX MAZEL, Primary Examiner

J. A. NARCAVAGE, Assistant Examiner

U.S. Cl. X.R.

128—417; 260—999; 424—2